W. F. ROSE.
TIRE SETTER BRIDGE PLATE.
APPLICATION FILED FEB. 8, 1912.
1,058,791.
Patented Apr. 15, 1913.
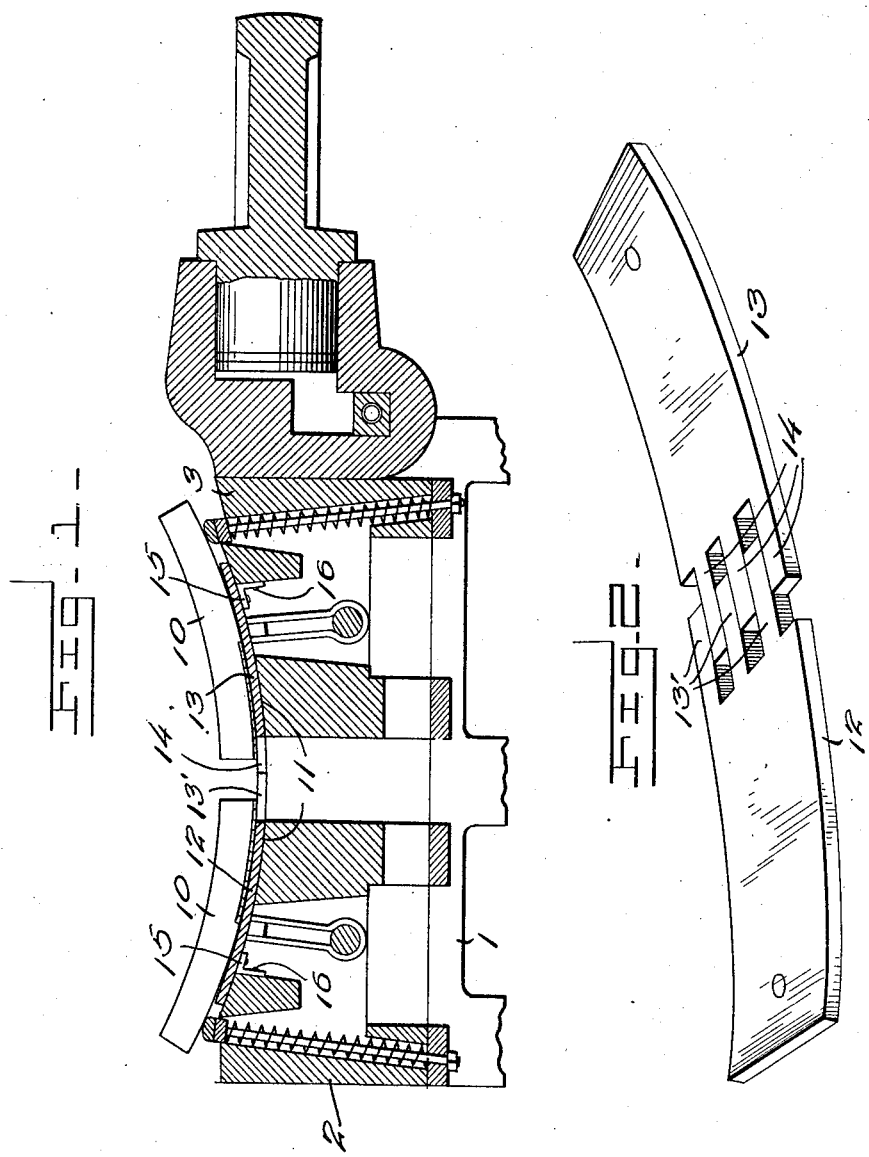

UNITED STATES PATENT OFFICE.

WILHELM F. ROSE, OF LA MOURE, NORTH DAKOTA.

TIRE-SETTER BRIDGE-PLATE.

1,058,791.      Specification of Letters Patent.      Patented Apr. 15, 1913.

Application filed February 8, 1912. Serial No. 676,338.

*To all whom it may concern:*

Be it known that I, WILHELM F. ROSE, a citizen of the United States, residing at La Moure, in the county of Lamoure, State of North Dakota, have invented certain new and useful Improvements in Tire-Setter Bridge-Plates; and I do hereby declare the following to be a full, clear, and exact description of the invention, such as will enable others skilled in the art to which it appertains to make and use the same.

This invention relates to cold tire setting machines, more particularly to bridge plates of machines of this type.

Hitherto it has been the custom to set a loose bridge plate between the head blocks of the machine to support the tire during the upsetting operation. A disadvantage results from this construction, namely, the bridge plate at times works out of place in its seat and necessitates manual replacing to accomplish the best results with the tire setting machine. To obviate this difficulty, I provide a bridge plate in two pieces, each secured to its respective block, so that displacement of the bridge plate will be prevented.

A further object of the present invention is to provide a bridge plate having a centrally disposed slightly yielding portion so that during the upsetting operation, the tire will be upset to a greater extent over this yielding portion than near the outer ends of the bridge plate so that contrary to the usual uniform upsetting of the tire throughout the lengths of the gripping jaws, the upsetting of the tire will be concentrated to a greater extent directly over the yielding portion of the bridge plate, thus permitting of the upsetting of a tire being accomplished more quickly than usual. To form a slightly yielding bridge plate, I form the two sections of my bridge plate with intermeshing fingers on their opposing ends, these fingers yielding to an almost inappreciable extent during the upsetting operation, as they intermove.

With the above objects in view the invention consists in certain novel details of construction and combination of parts hereinafter fully described and claimed, it being understood that various modifications may be made in the minor details of construction within the scope of the appended claim.

In the accompanying drawings forming part of this specification:—Figure 1 is a longitudinal sectional view of a tire setting machine with my improved bridge plate applied thereto. Fig. 2 is a perspective view showing the two parts of my improved bridge plate.

Referring now to the drawings in which like characters of reference designate similar parts, an ordinary cold tire upsetting machine is shown, and comprises essentially a frame 1 which supports the gripping head blocks 2 and 3. The head block 3 is stationary while the head block 2 is slidably mounted on the frame. The triangular shaped gripping jaws 10 which are carried in inclined ways in the head blocks are advanced toward each other and upset the tire. Both head blocks are suitably recessed in their upper faces as shown at 11 for the reception of a bridge plate.

It is to be understood that the machine here shown is for the purpose of illustration only, and comprises no part of the present invention, which rather resides in a novel form of two piece bridge plate designed to be attached to the head blocks 2 and 3 of the machine.

Referring now to Fig. 2 it will be seen that the bridge plate comprises a pair of arcuate sections 12 and 13, the sections being mutilated to form snugly intermeshing fingers 13' and 14 at their meeting, these fingers presenting a slightly resilient bridge as they interwork during relative movement of the head blocks. Each section is provided on its convex or reverse face with an angle iron clip 15 which is designed to bear upon the advance face of the corresponding block and be bolted thereto as shown at 16. The sections may be made in various widths and the fingers may vary in number to adapt the device to various conditions of service. By virtue of the closely intermeshing fingers 13' and 14 forming a slightly resilient bridge at the meeting of the sections, the upsetting of the tire will be concentrated to a greater extent directly over this yielding portion of the bridge plate than near the outer ends of the bridge plate contrary to the usual uniform upsetting of the tire throughout the lengths of the gripping jaws. By virtue of this concentration of the upsetting of the tire to a small area of the tire, the operation of upsetting the tire on a wheel will be accomplished more quickly than usual. By virtue of the angle iron clips carried upon the bottom faces of the sections, there will be no obstructions existing upon the working faces of the sections as in the case of bolts passed vertically through the sections into the heads of the machine, which bolts are apt to work loose and prevent the vehicle wheel from being placed in proper position upon the sections to effect the best results.

What is claimed, is:—

A bridge plate for cold tire upsetting machines including arcuate sections, an angle iron clip on the bottom face of each section for attachment to the related head block of a tire upsetting machine, said sections having intermeshing fingers on their opposing ends, said fingers being capable of yielding slightly during the upsetting operation as they intermove.

In testimony whereof, I affix my signature, in presence of two witnesses.

WILHELM F. ROSE.

Witnesses:
W. J. HUGHES,
W. R. EVES.

Copies of this patent may be obtained for five cents each, by addressing the "Commissioner of Patents, Washington, D. C."